3,011,978
LUMINESCENT PRINTING COMPOSITION AND
METHOD OF MAKING THE SAME
Earl J. Gosnell, Irondequoit, and Curtis W. Ingalls, Fairport, N.Y., assignors to Burroughs Corporation, Detroit, Mich., a corporation of Michigan
No Drawing. Filed July 16, 1959, Ser. No. 827,435
18 Claims. (Cl. 252—301.3)

This invention relates to luminescent printing compositions, that is, to compositions which can be used as inks in conventional letterpress and offset-printing equipment to apply luminescent marks, or in some cases luminescent spots which may be indiscernible under ordinary illumination, to a paper web, and relates in particular to nonvolatile, nondrying printing compositions having photoluminescent properties. While the compositions of this invention are capable of a wide range of applications, they are suited particularly for use in printing data symbols on bank checks, tickets, or any record member to be used for controlling machines provided with scanning means sensitive to photoluminescent emission, and especially, using formulations of a preferred type, where it is desired that such data be substantially invisible under ordinary illumination so as not to interfere with the ordinary printed matter on the record member.

Photoluminescent emission is termed phosphorescence when there is a continued luminescent radiation after termination of excitation, while materials which cease to luminesce as soon as the exciting irradiation is removed are called fluorescent. As applied to the preferred embodiments of the present invention, the term phosphorescent refers to luminescence which persists for a period when observed after termination of excitation by electromagnetic radiation of wave length less than 4000 angstroms. That is, the exciting source preferably is of a wave length, usually termed ultraviolet, outside the visible or ocular spectrum of wave lengths between 4000 and 8000 angstroms. A preferred type of printing composition made according to this invention, when referred to as having phosphorescent properties, should be capable of being used to record data in the form of marks or spots which will retain at least 90% of their original luminescent response level 25 milliseconds after cessation of radiant excitation so as to perform most usefully for recording and control purposes.

The photoluminescent materials available to the prior art can be classed generally as activated inorganic materials and as organic materials, primarily organic dyes. The organic materials, however, while exhibiting fluorescent luminescence, do not have any phosphorescent properties. Compositions have been known for many years using inorganic pigments which exhibit both fluorescent and phosphorescent properties, but, due to the large particle sizes of the usual forms of these pigments and the limitations of the ordinary nondrying vehicles used for carrying them, they were not satisfactory for use in the form of nondrying printing compositions for the letterpress and lithographic fields. Luminescent letterpress and lithographic printing inks also have been known, but these ordinarily have used organic materials, primarily organic dyes, and hence did not provide any phosphorescent properties, or have been limited to inks with drying vehicles and having poor printing characteristics.

Many of the aforementioned known inorganic activated luminescent materials exhibit useful luminescence on exposure to ultraviolet light alone and yet have little or no daylight color, so that a deposit of the material on a white background is difficult to see under continued daylight irradiation or ordinary room illumination.

As suggested above, luminescent inorganic pigments of large ultimate particle size, well over five microns, long have been known which have the property of phosphorescence, and in fact some of these pigments will emit readily detectable visible radiation for periods measurable in minutes or even hours after termination of irradiation of the pigment. When more finely ground, however, the luminescent response of these pigments was destroyed, or at least was limited to fluorescence or emission of visible radiation having distinctive spectral distribution during, but not after, irradiation by light such as ultraviolet light or daylight; presumably this change in response was due to cleavage of the crystallites. Nevertheless, certain pigments now are available in a more finely comminuted form, having nominal ultimate particle sizes of the order of one micron, which still retain a phosphorescent response although having a more rapid decay characteristic or shorter time constant than the pigments of large ultimate particle size. Although this response of the more finely comminuted pigment is a phosphorescent characteristic in the strict sense, it may be referred to loosely as a "lag fluorescence" because of the relatively shorter decay time constant.

The ultimate particle sizes of these more finely comminuted and more rapidly decaying phosphorescent pigments fall within a range from about 0.5 to about 5 microns in diameter, and their phosphorescent decay characteristics are such that, relative to the luminescent response just prior to termination of the exciting radiation, at least 90% of the luminescence of a printed deposit is retained 25 milliseconds after excitation, so that the aforementioned phosphorescent performance requirement can be satisfied. Assuming the classical exponential decay characteristic after cessation of excitation, the decay time constant may be defined as the time elapsed thereafter until the response has decayed to 36.8% (the reciprocal of the natural base $e$) of the value just prior to cessation; this time constant equals the time which would be required for decay to zero if the decay were to continue at the same rate as the initial rate at the instant when excitation is removed. A time constant somewhat less than a quarter of a second (250 milliseconds) corresponds to an exponential decay to 90% after 25 milliseconds. Decay characteristics with longer time constants, corresponding to considerably longer periods of retained luminescence, are obtainable in some pigments having these smaller particle sizes. Such decay characteristics are desirable and preferred for present purposes, as already indicated.

A difficulty arises, however, because such pigments as manufactured have a strong tendency to agglomerate and form much larger aggregates. These aggregates range generally in particle size from 0.5 to 40 microns, most of the particles ordinarily being well over 5 microns in diameter. These aggregate particles can be broken up only with considerable working, even when the pigment is dispersed in a liquid as a paste or as a more dilute dispersion, and attempts to break them up again may require unusual and expensive care, or may result in loss of some or all luminescent properties, as indicated above.

Nondrying ink vehicles, such as certain grades of mineral oils and certain castor oil products, are used in conventional inks when a fairly free-flowing ink is desired for use in equipment which would become fouled by an ink having a drying oil vehicle unless the equipment were cleaned after each use or printing run. The present invention deals with nondrying compositions for use where clogging is a problem and difficulty may be encountered in keeping the ink-supplying and ink-distributing apparatus clean, especially when the printing equipment is used only intermittently. Nondrying vehicles produce apparently dry imprints only because of absorption into the stock after printing. Usually, for use in compositions to be printed on any type of paper except the cheapest grades of newsprint stocks, it has been necessary to include a substantial proportion of a drying oil to insure eventual drying of the printed composition. Mineral oils have the disadvantage of tending to strike through the paper, causing greasy stains and separation of pigment from the vehicle. Consequently these oils have not been used in any great proportions in any of the better grades of printing compositions. Also, if the affinity between the pigment and the vehicle is not great enough almost complete separation of the two will result. In such a case the pigment will remain on the paper due to a filtration effect, and, since there is little or no retained vehicle present to bind the pigment particles together, the pigment is left in the form of a powder which readily brushes off or smudges across the paper surface. The conventional nondrying oils have been found to make generally inferior vehicles for photoluminescent pigments. Castor oil vehicles, as well as many drying vehicles, tend to discolor upon oxidation or drying, and this may cut down any luminescent response of an ink. These problems are complicated further by the great difficulty of distributing the inorganic luminescent pigments in an acceptably unagglomerated and dispersed condition throughout the vehicle without subjecting the pigment particles to a comminuting operation of a nature tending to destroy the desired luminescent properties.

It is an object of this invention, therefore, to provide a new and improved luminescent printing composition and a new and improved method of making such luminescent printing compositions which avoid one or more of the disadvantages of the prior known compositions and ink-making procedures.

It is another object of the invention to provide a new and improved luminescent printing composition which provides high intensity of luminescence when observed either during or shortly after excitation by electromagnetic radiation of ultraviolet wave lengths in the range of 3200 to 3800 angstroms.

Yet another object of this invention is to provide a new and improved luminescent printing composition which has a substantially colorless, nondrying vehicle but which can dry, or more accurately can become non-offsetting and non-smudging, quickly by absorption after printing.

A further object of the invention is to provide a new and improved luminescent printing composition which is substantially invisible under ordinary daylight, will not oxidize or discolor, harden, settle out, or become otherwise unstable on aging, and has phosphorescent luminescence of high intensity.

A still further object of this invention is to provide a new and improved method of making a luminescent printing composition involving the breaking down of aggregated particles of metal sulfide pigment into printable, finely divided form with facility and without excessive loss of luminescent properties.

It is also an object of the invention to provide a new luminescent printing composition, and method of making such composition, which has excellent printing characteristics while including an improved nondrying vehicle for association with a solid photoluminescent material.

In accordance with the invention, a luminescent printing composition consists essentially of a synthetic liquid hydrocarbon vehicle polymerized from at least one monomer selected from the group consisting of 2-methylpropene, 1-butene, 2-butene, 2-methyl-1-butene, 2-methyl-2-butene, and 2-pentene and having a viscosity at room temperature within the range of 2.5 to 1,000 poises and an average molecular weight within the approximate range of 400 to 1,300; and of pigment particles, including in major amounts thereof particles of a solid photoluminescent material, having printable particle sizes, dispersed throughout the vehicle.

In accordance with another feature of the invention, the method of making a luminescent printing composition comprises mixing a particulate material selected from the group consisting of a photoluminescent pigment and of such a pigment with not more than an equal weight of a powdered extender material into a synthetic liquid catalytically polymerized from at least one monomer selected from the group consisting of 2-methylpropene, 1-butene, 2-butene, 2-methyl-1-butene, 2-methyl-2-butene, and 2-pentene to form a liquid hydrocarbon vehicle having a viscosity at room temperature within the range of 2.5 to 1000 poises and an average molecular weight within the approximate range of 400 to 1,300; and milling the resultant mixture until the pigment and any such extender material are dispersed in the vehicle in particles effectively all of which are of printable particle sizes.

For formulating luminescent printing compositions, a vehicle is desired which will not dry in the ink fountain of a press, on the press rollers, or on type members or a printing plate, but which nevertheless will become resistant to smudging and offsetting quickly after printing on paper stock. Furthermore, the vehicle must be essentially colorless and transparent, at least at the wave lengths of the exciting radiation and the emitted luminescent radiation, so as not to attenuate unduly the desired luminescent response. While exhibiting a viscosity suitable for use in at least one type of printing equipment, the vehicle should have an unusual combination of high tack and good cohesivity, which aids in setting up the high shearing forces needed to break apart luminescent pigment aggregates to be mixed with the vehicle without impairing the luminescent properties of the pigment. Another property desirable in the vehicle is a neutral condition or a low acid number, since several of the luminescent pigments found to be useful in luminescent printing compositions tend to lose their luminescent properties by chemical reaction or other adverse influence in an acidic medium.

To provide a liquid vehicle having the desirable properties just enumerated, a luminescent printing composition comprises a synthetic liquid hydrocarbon vehicle polymerized from at least one monomer selected from the group consisting of 2-methylpropene, 1-butene, 2-butene, 2-methyl-1-butene, 2-methyl-2-butene, and 2-pentene and having a viscosity at room temperature within the range of 2.5 to 1,000 poises and an average molecular weight within the approximate range of 400 to 1,300.

Particularly suitable and preferred for this purpose are synthetic liquids polymerized from normal and branched chain butenes. These polymers and copolymers, produced by the limited catalytic polymerization of such butenes, are known commercially as polybutenes and are available within the specified ranges of viscosity and molecular weight. Some of these liquid polybutenes of commerce are more or less pure polyisobutylene, that is, polymeric products derived from fairly pure, technical grade monomeric 2-methylpropene or isobutylene, $$(CH_3)_2C{:}CH_2$$

a branched chain butene. Other polybutenes, as indicated hereinabove, are copolymers of mixed butenes, including additionally 1-butene, $CH_3 {\cdot} CH_2 CH {:} CH_2$, or 2-butene, $CH_3 {\cdot} CH {:} CH {\cdot} CH_3$ (cis and trans forms), or both of these normal or straight chain butenes. Polymers of only the last mentioned straight chain monomers, 1-butene and 2-butene, also are useful.

Similarly, there may be present in the monomeric butene material mixtures of certain methyl-substituted branched chain or straight chain butenes, specifically 2-methyl-1-butene, $CH_3 {\cdot} CH_2 {\cdot} C(CH_3){:}CH_2$; 2-methyl-2-butene, $CH_3 {\cdot} CH {:} C(CH_3)_2$; and 2-pentene, $$CH_3 {\cdot} CH_2 {\cdot} CH {:} CH {\cdot} CH_3$$

(cis and trans forms). Alternatively one or more of these pentenes may serve as the monomeric material without inclusion of an unsubstituted butene.

A synthetic liquid polybutene vehicle copolymerized from monomeric 2-methylpropene and some straight chain butene, and having a viscosity at room temperature within the range of 2.5 to 1,000 poises as measured on a Brookfield viscosimeter using recommended spindles and speeds, makes a good vehicle, and such a polymer has an average molecular weight approximately within the range of 450 to 1,100. Such polyisobutylene or polybutene vehicles having a viscosity of between 15 and 400 poises, corresponding roughly to molecular weights of about 550 to 950, are preferred. One such polybutene obtainable commercially as "Oronite Polybutene, No. 24," is nearly water white in color and has a room temperature viscosity of about 240 poises, a pour point of 10° F., an average molecular weight of approximately 935, a specific gravity of 0.89 at 60/60° F., and an acid number of 0.04 mg. KOH per gram.

Other polybutene materials also are obtainable commercially in a graded series, the members of which are identified as high molecular weight mono-olefinic butylene polymers including perhaps several percent of isoparaffins. An eminently suitable grade of polybutene from this series, "Indopol Polybutene, Grade H–100," has an average molecular weight of approximately 780 with a viscosity of 200 poises at 77° F., specific gravity of 0.88, a pour point of 20° F. (ASTM), and a refractive index of 1.492. Other suitable grades are available from this series designated "Grade H–35" and "Grade L–100," with average molecular weights of approximately 660 and 470 respectively, viscosities of 38 and 4.8 respectively at 77° F., and pour points of 0° F. and −25° F. respectively. Still other polybutenes within the specified ranges of viscosity and molecular weight are obtainable readily from various suppliers, and mixtures of two such polybutene products also have been used successfully to provide the exact viscosity and other properties desired in inks for particular printing applications.

When polymers of the other monomeric materials listed hereinabove, or copolymers of other mixtures of such monomers, are chosen, suitable liquid vehicles likewise having the desired viscosity, within the range of 2.5 to 1,000 poises, may be obtained. However, the monomeric methyl-substituted butenes, or pentenes, listed hereinabove have higher molecular weights than the butenes, and these pentenes in general reach their boiling points and other significant equivalent properties at temperatures higher than the butenes. With the monomeric pentenes, somewhat lower degrees of polymerization can be expected to give polymers within the viscosity range specified for the polymeric ink vehicles. Of course, even when the monomeric material is limited to the specified butenes and pentenes, a synthetic polymeric liquid vehicle, although having a given average molecular weight, will have a viscosity at a stated temperature which still depends to some extent on the exact composition of the monomer or monomeric mixture from which the polymer is obtained. Having found a liquid polymerized to obtain a viscosity within the desired range, however, only those polymers having an average molecular weight within the approximate range of 400 to 1,300 should be chosen as the ink vehicle, thus insuring that a nondrying liquid vehicle is obtained which has the desired physical properties, particularly the combination of cohesiveness, adhesiveness, tack, and suitability for effecting the necessary pigment dispersion by milling in a vehicle transparent to visible and ultraviolet light.

The luminescent printing composition further comprises particles of a solid photoluminescent material dispersed throughout the vehicle. The solid particles incorporated in the printing compositions of the present invention must have printable particle sizes. For this purpose the word "particle" is defined broadly to include any aggregate, containing a plurality of the ultimate pigment particles or grains, which may be retained as a unitary mass in the printing composition. It will be recognized by those familiar with pigments as used in printing inks that this requirement means not only substantial freedom from extraneous grit but also a general particle size distribution, without large aggregates, which avoids particles too large for application to the web in a printing operation such as letterpress or lithographic printing. A good rule is to exclude substantially all particles larger than five microns, and most of the particles should be smaller than two or three microns in diameter, as may be determined by conventional statistical measurements using an optical microscope. To determine readily whether or not too many oversized particles are present for reasonable printability, a Hegman gauge may be used, as known in the art; smooth deposits should be capable of being drawn down to a point corresponding to about 7.5 on the conventional North Standard or "NS" Scale, running from 0 to 8 for grading of inks containing progressively finer pigments. The Hegman gauge is described in a "Handbook of Ball and Pebble Mill Operation," published by Paul O. Abbe, Inc., Little Falls, New Jersey, under the heading "Measuring Fineness of Wet Materials" on page 29. The fineness-of-grind gauge there illustrated may be obtained from at least one gauge manufacturer in this field. A similar gauge, identified as a grindometer, is described and illustrated on page 8 of the "Printing Ink Handbook," published in 1958 by National Association of Printing Ink Makers, Inc., New York.

Printing compositions in accordance with an important embodiment of the present invention comprise photoluminescent inorganic pigment particles of printable particle sizes, preferably dispersed throughout the vehicle in a proportion of between one fourth and two parts by weight per part of the vehicle. As examples, any of a number of sulfide, silicate, and zirconate pigments may be chosen. Particularly suitable are pigments selected from the group consisting of photoluminescent sulfides of zinc, of cadmium, and combinations thereof, having particle sizes most of which are considerably less than five microns in diameter, and carefully prepared before incorporating in the ink vehicle so as to preserve the short-period phosphorescent response. Thus photoluminescent zinc sulfide pigment advantageously may be selected, or alternatively cadmium-zinc sulfide or cadmium sulfide may be dispersed in the vehicle. Silicates of cadmium, calcium, strontium, or zinc, and zinc zirconate, also may be obtained for this purpose. As is well known with regard to fluorescent materials of this type, these phosphors for best results ordinarily contain a metallic activator such as silver, copper, neodymium, or manganese in trace amounts. Activation also often involves suitable high temperature treatments during the synthesis of the pigments, as is known in the art. As printed from the printing composition on a white paper web, particles of these sulfide pigments having the aforementioned small particle sizes, although exhibiting little or no color as observed by daylight, are capable of retaining at least 90% of their luminescent response in the visible wave length range 25 milliseconds after cessation of ultraviolet radiant excitation. Thus, spots printed from an ink containing a zinc sulfide phosphor, activated with trace amounts of copper, were excited with a six watt fluorescent lamp using a Corning No. 587 filter, fixed 26 inches from the test surface. The luminescent response had a dominant wave length of 5380 angstroms, and its brightness was measured, during and after excitation, by a photocell reading unit in an optical system shielded from stray radiation. The decay characteristic after cessation of excitation was found to have a decay time constant of about 0.6 second, and, 25 milliseconds after cessation of excitation, the response had decayed to about 95% of its value under excitation, well within the limit of 90% decay (or a time constant of about 0.25 second)

deemed necessary for an adequate phosphorescent response characteristic.

Frequently in printing compositions an extender or printability agent is added to provide body and improve other rheological characteristics of inks containing dense, low-oil-absorptive pigments. Such an extender may be added to the mixture of photoluminescent pigment and polymeric vehicle, as convenient, although compositions comprising only a photoluminescent pigment and the polybutene vehicle have been found to perform satisfactorily. If an extender is to be added it should have an index of refraction substantially the same as that of the vehicle, that is, within about 5% of the refractive index of the vehicle, to insure that the printing composition will remain substantially transparent when printed. These materials usually are obtained as powders which, when aggregates are broken up, as when dispersed with ordinary care in a vehicle, have the form of powder particles practically all of which are within a readily printable particle size range of one tenth micron to one micron, that is, substantially less than five microns. A number of such extenders (which also may be designated pigments) may be listed as follows: aluminum hydroxide (alumina hydrate), calcium carbonate, barium sulfate, magnesium hydroxide, magnesium carbonate, and diatomaceous and synthetic silicas. A luminescent printing composition made up of a polybutene vehicle and a pigment such as zinc sulfide or cadmium-zinc sulfide, dispersed in printable particle sizes, also may comprise, dispersed in the vehicle, powder particles of an extender of the type just described having an index of refraction substantially the same as that of the polybutene vehicle.

Certain metallo-organic pigments also are suitable for inclusion in luminescent printing compositions in accordance with another preferred embodiment of the invention. Thus, a number of the metal salts of 8-quinolinol (8-hydroxyquinoline or oxine) have a strong fluorescent luminescent response which has been found to be particularly advantageous when printed from an ink utilizing the aforementioned type of synthetic liquid hydrocarbon vehicle, although little or no phosphorescent response is observed after cessation of excitation. In addition to the luminescent response of these salts, when included in finely powdered form in such an ink with particle sizes again, of course, substantially less than five microns, they have been found also to confer excellent printability qualities and thus are useful as extenders, instead of or in addition to materials such as alumina hydrate, mentioned hereinabove.

These salts of 8-quinolinol are viewed generally as being inner complex salts in which one of the principal valence bonds of one atom of the metal replaces the hydrogen of the phenolic hydroxyl group in one 8-quinolinol molecule, while there is an auxiliary valence linkage between the metal and the nitrogen in the adjacent ring of the quinoline molecule.

Of particular utility for inclusion in printing compositions comprising, preferably, the aforementioned polybutene vehicle, is the magnesium salt of 8-quinolinol, which exhibits unexpectedly intense luminescence, but with little or no daylight color, while imparting excellent printing characteristics. Other salts of 8-quinolinol, moreover, also are useful in printing compositions, although ordinarily with a noticeably lower luminescent response or much more obvious daylight color; some of these other salts, such as the zinc salt, have been known heretofore and have been recognized as exhibiting luminescence. Thus, in accordance with this embodiment of the invention, a luminescent printing composition comprises a synthetic liquid polymeric hydrocarbon vehicle, as defined hereinabove, and powder particles of a solid photoluminescent material made up of the salt of 8-quinolinol and a metal selected from the group consisting of magnesium, aluminum, calcium, zinc, strontium, and cadmium dispersed throughout the vehicle. When a fluorescent printing composition is desired which need not provide sustained luminescence after excitation is removed, a composition comprising only the vehicle and the metal salt of 8-quinolinol has been found to be excellent, the powdered salt preferably being dispersed throughout the vehicle in a proportion by weight of between five and thirty percent of the entire printing composition.

While these metallo-organic pigments provide excellent fluorescent and printing properties when compounded with the vehicle alone, these metal salts of 8-quinolinol can be included in place of a material which serves primarily as an extender, such as those mentioned hereinabove, in an ink composition having another luminescent or phosphorescent material, and these metal salts then have the added advantage of increasing the luminescence of the printed composition when observed during excitation. Formulations comprising not only an inorganic phosphorescent pigment but also the powdered magnesium salt of 8-quinolinol provide, in addition to the phosphorescent response, both higher fluorescent response and the improved printing characteristics obtainable by adding a good extender. In some cases the inclusion of an extender such as alumina hydrate, in addition to the fluorescent magnesium salt, still may be desirable to obtain the best printing characteristics without incurring the additional cost of a larger proportion of the salt. Accordingly, a printing composition comprising a polymeric vehicle as described hereinabove, such as the polybutene vehicle, and also a luminescent inorganic pigment, such as a sulfide of zinc or cadmium or cadmium-zinc sulfide, in a proportion of between one fourth and two parts by weight of pigment per part of the vehicle, advantageously may comprise additionally powder particles of a luminescent salt of 8-quinolinol, preferably the magnesium salt, dispersed in the vehicle in a proportion by weight of between two and six percent of the entire printing composition.

A preferred luminescent printing composition embodying the present invention is illustrated by the formulation of Example 1.

*Example 1*

| | Parts by weight |
|---|---|
| Polybutene, viscosity 250 poises | 60 |
| Activated zinc sulfide pigment | 40 |

The method of making a luminescent printing composition such as that of Example 1 comprises catalytically polymerizing a monomeric material including at least one compound selected from the group consisting of 2-methylpropene, 1-butene, 2-butene, 2-methyl-1-butene, 2-methyl-2-butene, and 2-pentene to form a liquid hydrocarbon vehicle having a viscosity at room temperature within the range of 2.5 to 1,000 poises and an average molecular weight within the approximate range of 400 to 1,300. A preferred monomeric material is a butene material, and an excellent liquid polybutene vehicle may be copolymerized catalytically from normal and branched chain butenes. Ionic polymerization in bulk may be carried out rapidly using undiluted liquid monomeric material with continuous agitation and temperature control.

The details of the production of the polybutene or similar polymeric vehicle are not a part of the present invention. A number of papers have been published during the past 20 years on the formation of liquid polymers of various methyl-substituted butenes, or pentenes, and there is considerable literature on the production of liquid polybutenes of the type specified for the ink vehicle in accordance with the present invention. One source of information regarding these polybutenes is the book "Polymer Processes," edited by C. E. Schildknecht, Interscience Publishers, Inc., New York, 1956. Reference may be made in this book to pages 33 and 201–203, and other publications on this subject are referred to on these pages. Thus, as examples, one of the less energetic catalysts, such as stannic chloride with water as a cocatalyst, may be used. Control of temperature to maintain conditions much colder than 0° C. has been resorted to in the production of the higher, solid butyl polymers, but in forming the desired liquid polymers of lower molecular weight it usually is preferable to maintain temperatures in the neighborhood of the boiling point of the monomeric material or only somewhat colder than that temperature. The butenes, when present as single unmixed monomers, have boiling points in the range of −6° C. to 3° C., while the monomeric methyl-substituted butenes or pentenes specified herein have individual boiling points in the range of 31° C. to 39° C. The polymerization is carried out with the usual precautions known to the art for avoiding formation of a polymeric product containing excessive amounts of monomeric or only slightly polymerized material, or of overpolymerized material, deviating greatly from the average molecular weight of the product.

The particulate photoluminescent inorganic pigment, such as the metal-activated zinc sulfide or other pigment selected from the group consisting of sulfides of zinc, of cadmium, and combinations thereof, is mixed into the vehicle in any suitable mixing apparatus, in which there is obtained a thorough general distribution of the particles, and their surfaces are wet by the vehicle. The mixing may be carried out, for example, in a rotating change can mixer having several counter-rotating blades. The mixture then is milled, advantageously by passing several times through a three roll ink mill at progressively closer roll settings, until the pigment is dispersed in the vehicle in particles effectively all of which are of printable particle sizes. Care should be taken to avoid excessive local pressures with metallic parts of the mill, and to avoid such effects and contamination it was found advisable to substitute wooden end guards for the brass members provided at the ends of the rolls to confine the material within the mill. A suitable zinc sulfide pigment of small ultimate particle sizes is available as "Fluorescent Pigment No. 2210" and provides high phosphorescent response with a time constant more than twice the minimum specified hereinabove.

Example 2 illustrates similar luminescent inks including additionally an extender, which serves as an agent for improving the printing characteristics of the composition.

*Example 2*

|  | Parts by weight |
|---|---|
| Polybutene | 56 |
| Cadmium-zinc sulfide pigment | 40 |
| Alumina hydrate powder | 4 |

In formulating the ink of Example 2, the particulate photoluminescent inorganic pigment having printable ultimate particle sizes and the powdered alumina hydrate extender material are mixed into the synthetic polymeric liquid vehicle, followed by milling as with the materials of Example 1 to reduce large agglomerates of the sulfide pigment and to disperse the sulfide pigment and the extender material throughout the vehicle in particles effectively all of which have printable particle sizes. The alumina hydrate improves the body of the ink composition. Its refractive index and that of the vehicle should be approximately the same. A suitable cadmium-zinc sulfide pigment giving high luminescence and a sufficiently long time constant has been made under the designation "Fluorescent Pigment No. 2276."

Example 3 is an example of inks containing inorganic phosphorescent pigment which also contain a fluorescent salt of 8-quinolinol. The magnesium salt in this example falls within the most advantageous proportions of two to six percent of the weight of the composition, although the amount of 2.4% was chosen toward the lower end of this range of proportions due to the high effectiveness of the magnesium salt and to the presence of about the same proportion of alumina hydrate, which also contributes to the printability of the formulation.

*Example 3*

|  | Parts by weight |
|---|---|
| Polybutene | 55.7 |
| Zinc sulfide pigment | 39.0 |
| Magnesium salt of 8-quinolinol, fine powder | 2.4 |
| Alumina hydrate | 2.9 |

The three pigments included in the formulation of Example 3 are mixed thoroughly with the polybutene vehicle to wet the pigments and thereby assist in the subsequent breaking down of cohesive forces within aggregates present in the pigments. It is seen that the photoluminescent inorganic sulfide pigment thus is mixed into the vehicle along with not more than an equal weight of other powdered materials which serve as extenders for the sulfide pigment; the salt of 8-quinolinol, being fluorescent, serves not only as an extender but also to supplement the photoluminescent properties provided by the phosphorescent sulfide pigment. The resulting crude dispersion then is run several times through a conventional three roll ink mill with progressive increases in the pressures between the rolls, whereupon the composition is ready for use in printing. It appears from Examples 2 and 3 that the pigment particles in the inks include a luminescent or phosphorescent pigment in major amounts, while the alumina hydrate or other pigment particles which serve only as extenders, when present, make up a distinctly minor proportion of the particles dispersed in the polymeric liquid vehicle.

In place of the polybutene vehicles of these examples there may be substituted, in equal proportions, polypentene vehicles or copolymers of the specified butenes or pentenes or both, as discussed hereinabove, with effectively the same results, depending primarily upon the molecular weight and viscosity of the vehicle selected. In general, it will be evident to those skilled in the polymerization art that liquid polymers which contain major proportions of polymeric hydrocarbons having a straight chain structure with many short side branches are likely to be produced by the polymerization or copolymerization to the desired degree of any of these monomeric alkenes or mixtures thereof. Also, other fluorescent inorganic phosphors having the ultimate particle sizes required for printability may be substituted in equal proportions for the zinc and cadmium sulfides included in these examples. Furthermore, a rather wide latitude of proportions of vehicle and pigment is available, the limits found to be desirable having been indicated hereinabove.

In all cases, the polybutene or related vehicle, probably by virtue of its combination of properties of high tack, cohesiveness, wetting power, and viscosity, produces high shearing forces during the milling which aid in tearing apart the agglomerates of the sulfide pigment to obtain particles of printable size, ordinarily ranging in diameter from 0.5 micron to 5 microns. The aggregates of pigment, as referred to above, are clusters of particles formed by cementation during the drying of the ground pigment. What is accomplished in the milling operation in accordance with this invention is the breaking apart of these aggregates and dispersion of the particles in the vehicle, which is accomplished with little or no reduction in the ultimate particle size and hence without impairment of phosphorescent response.

*Example 4*

|  | Parts by weight |
|---|---|
| Magnesium salt of 8-quinolinol | 10 |
| Polybutene | 90 |

To make the ink of Example 4, the salt of 8-quinolinol, which is obtained as a fine powder, is mixed with the polybutene vehicle and milled, following the method described for the formulation of Example 1 above, although the milling can be less extensive and energetic. This gives a printing composition with high fluorescent intensity but with little or no phosphorescent response.

Any of these formulations may benefit by the inclusion of a wetting or dispersing agent in small quantity. Certain monovalent tertiary amine bases are recommended for this purpose, and they serve the additional function of lowering the acidity of the mixture, which is beneficial for the phosphorescent response of some pigments. Materials of the type of 1-substituted 2-heptadecyl-2-imidazoline may be used, an example being identified as "Amine O," having a molecular weight of 355. Such agents may be added, for example, in an amount of about 0.2% of the total weight of the ink composition.

The formulations of the above examples, and other formulations in accordance with the present invention, provide highly tacky, nondrying printing compositions which are absorbed quickly on the paper stock to leave an effectively dry but strongly adherent deposit without strike-through or separation of pigment particles from the vehicle, the high tack and cohesivity of the vehicle providing adequate affinity between pigment particles and vehicle. Heavy deposits may be printed very readily from fairly viscous inks of these compositions without building up unwanted deposits on the type or on transfer rolls. These properties of the inks in accordance with the present invention insure an adequate deposit of luminescent material on a record member when the composition is used to record data thereon to be used, for example, in controlling a machine provided with a scanning means sensitive to photoluminescent emission.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A luminescent printing composition, consisting essentially of: a synthetic liquid hydrocarbon vehicle polymerized from at least one monomer selected from the group consisting of 2-methylpropene, 1-butene, 2-butene, 2-methyl-1-butene, 2-methyl-2-butene, and 2-pentene and having a viscosity at room temperature within the range of 2.5 to 1,000 poises and an average molecular weight within the approximate range of 400 to 1,300; and pigment particles, including in major amounts thereof particles of a solid photoluminescent material, having printable particle sizes, dispersed throughout said vehicle.

2. A luminescent printing composition, consisting essentially of: a synthetic liquid hydrocarbon vehicle polymerized from at least one monomer selected from the group consisting of 2-methylpropene, 1-butene, 2-butene, 2-methyl-1-butene, 2-methyl-2-butene, and 2-pentene and having a viscosity at room temperature within the range of 2.5 to 1,000 poises and an average molecular weight within the approximate range of 400 to 1,300; and pigment particles, including in major amounts thereof photoluminescent inorganic pigment particles of printable particle sizes dispersed throughout said vehicle.

3. A luminescent printing composition, consisting essentially of: a synthetic liquid polybutene vehicle having a viscosity at room temperature within the range of 2.5 to 1000 poises and an average molecular weight within the approximate range of 400 to 1,300; and pigment particles, including in major amounts thereof particles of a solid photoluminescent material, having printable particle sizes, dispersed throughout said vehicle.

4. A luminescent printing composition, consisting essentially of: a synthetic liquid polybutene vehicle having a viscosity at room temperature within the range of 2.5 to 1000 poises and an average molecular weight within the approximate range of 400 to 1,300; and pigment particles, including in major amounts thereof photoluminescent inorganic pigment particles of printable particle sizes dispersed throughout said vehicle, said photoluminescent particles as printed from said composition being capable of retaining at least 90% of their luminescent response 25 milliseconds after cessation of radiant excitation.

5. A luminescent printing composition, consisting essentially of: a synthetic liquid polybutene vehicle polymerized from normal and branched chain butenes and having a viscosity at room temperature within the range of 2.5 to 1000 poises and an average molecular weight within the approximate range of 400 to 1,300; and pigment particles, including in major amounts thereof photoluminescent inorganic pigment particles of printable particle sizes dispersed throughout said vehicle in a proportion of between one fourth and two parts by weight of said photoluminescent particles per part of said vehicle.

6. A luminescent printing composition, consisting essentially of: a synthetic liquid polybutene vehicle having a viscosity at room temperature within the range of 2.5 to 1000 poises and an average molecular weight within the approximate range of 400 to 1,300; and pigment particles, including in major amounts thereof photoluminescent inorganic pigment particles of printable particle sizes dispersed throughout said vehicle in a proportion of between one fourth and two parts by weight of said photoluminescent particles per part of said vehicle, said photoluminescent particles as printed from said composition being capable of retaining at least 90% of their luminescent response 25 milliseconds after cessation of radiant excitation.

7. A luminescent printing composition, consisting essentially of: a synthetic liquid hydrocarbon vehicle polymerized from at least one monomer selected from the group consisting of 2-methylpropene, 1-butene, 2-butene, 2-methyl-1-butene, 2-methyl-2-butene, and 2-pentene and having a viscosity at room temperature within the range of 2.5 to 1000 poises and an average molecular weight within the approximate range of 400 to 1,300; and pigment particles, including in major amounts thereof a photoluminescent pigment, having printable particle sizes, selected from the group consisting of sulfides of zinc, of cadmium, and combinations thereof, dispersed throughout said vehicle.

8. A luminescent printing composition, consisting essentially of: a synthetic liquid hydrocarbon vehicle polymerized from at least one monomer selected from the group consisting of 2-methylpropene, 1-butene, 2-butene, 2-methyl-1-butene, 2-methyl-2-butene, and 2-pentene and having a viscosity at room temperature within the range of 2.5 to 1,000 poises and an average molecular weight within the approximate range of 400 to 1,300; and pigment particles, including in major amounts thereof a photoluminescent pigment, having printable particle sizes, selected from the group consisting of sulfides of zinc, of cadmium, and combinations thereof, dispersed throughout said vehicle in a proportion of between one fourth and two parts by weight of said photoluminescent pigment per part of said vehicle.

9. A luminescent printing composition, consisting essentially of: a synthetic liquid hydrocarbon vehicle polymerized from at least one monomer selected from the group consisting of 2-methylpropene, 1-butene, 2-butene, 2-methyl-1-butene, 2-methyl-2-butene, and 2-pentene and having a viscosity at room temperature within the range of 2.5 to 1000 poises and an average molecular weight within the approximate range of 400 to 1,300; and pigment particles, including in major amounts thereof a photoluminescent zinc sulfide pigment, having printable particle sizes, dispersed throughout said vehicle in a proportion of between one fourth and two parts by weight of zinc sulfide pigment particles per part of said vehicle, said zinc sulfide particles as printed from said composition being capable of retaining at least 90% of their luminescent response 25 milliseconds after cessation of radiant excitation.

10. A luminescent printing composition, consisting essentially of: a synthetic liquid polybutene vehicle having a viscosity at room temperature within the range of 2.5 to 1000 poises and an average molecular weight within the approximate range of 400 to 1,300; and pigment particles, including in major amounts thereof a photoluminescent pigment, having printable particle sizes, selected from the group consisting of sulfides of zinc, of cadmium, and combinations thereof, dispersed throughout said vehicle.

11. A luminescent printing composition, consisting essentially of: a synthetic liquid polybutene vehicle having a viscosity at room temperature within the range of 2.5 to 1000 poises and an average molecular weight within the approximate range of 400 to 1,300; and pigment particles, including in major amounts thereof a photoluminescent zinc sulfide pigment, having printable particle sizes, dispersed throughout said vehicle.

12. A luminescent printing composition, consisting essentially of: a synthetic liquid polybutene vehicle having a viscosity at room temperature within the range of 2.5 to 1,000 poises and an average molecular weight within the approximate range of 400 to 1,300; and pigment particles, including in major amounts thereof a photoluminescent pigment, having printable particle sizes, selected from the group consisting of sulfides of zinc, of cadmium, and combinations thereof, and containing a metallic activator in trace amounts, dispersed throughout said vehicle in a proportion of between one fourth and two parts by weight of such sulfide pigment particles per part of said vehicle, said sulfide pigment particles as printed from said composition being capable of retaining at least 90% of their luminescent response 25 milliseconds after cessation of radiant excitation.

13. A luminescent printing composition, consisting essentially of: a synthetic liquid hydrocarbon vehicle polymerized from at least one monomer selected from the group consisting of 2-methylpropene, 1-butene, 2-butene, 2-methyl-1-butene, 2-methyl-2-butene, and 2-pentene and having a viscosity at room temperature within the range of 2.5 to 1,000 poises and an average molecular weight within the approximate range of 400 to 1,300; and pigment particles, including in major amounts thereof powder particles substantially less than five microns in size of a solid photoluminescent material, made up of the salt of 8-quinolinol and a metal selected from the group consisting of magnesium, aluminum, calcium, zinc, strontium, and cadmium, said powder particles of the salt of 8-quinolinol being dispersed throughout said vehicle in a proportion by weight of between five and thirty percent of the printing composition.

14. A luminescent printing composition, consisting essentially of: a synthetic liquid polybutene vehicle having a viscosity at room temperature within the range of 2.5 to 1000 poises and an average molecular weight within the approximate range of 400 to 1,300; and pigment particles, including in major amounts thereof powder particles substantially less than five microns in size of the magnesium salt of 8-quinolinol dispersed throughout said vehicle in a proportion by weight of between five and thirty percent of the printing composition.

15. A luminescent printing composition, consisting essentially of: a synthetic liquid polybutene vehicle having a viscosity at room temperature within the range of 2.5 to 1000 poises and an average molecular weight within the approximate range of 400 to 1,300; a photoluminescent pigment, having printable particle sizes, selected from the group consisting of sulfides of zinc, of cadmium, and combinations thereof, dispersed throughout said vehicle; and powder particles, substantially less than five microns in size and dispersed in said vehicle in a proportion by weight smaller than that of said sulfide pigment, of an extender having an index of refraction substantially the same as that of said polybutene vehicle.

16. A luminescent printing composition, consisting essentially of: a synthetic liquid polybutene vehicle having a viscosity at room temperature within the range of 2.5 to 1,000 poises and an average molecular weight within the approximate range of 400 to 1,300; and particulate solid materials in said vehicle, said solid materials comprising a photoluminescent pigment, selected from the group consisting of sulfides of zinc, of cadmium, and combinations thereof and having printable particle sizes, dispersed throughout said vehicle in a proportion of between one fourth part and two parts by weight of such photoluminescent pigment per part of said vehicle, and said solid materials further comprising powder particles, substantially less than five microns in size, of the magnesium salt of 8-quinolinol dispersed in said vehicle in a proportion of between two percent and six percent of the entire weight of the printing composition.

17. The method of making a luminescent printing composition, comprising: mixing a particulate material selected from the group consisting of a photoluminescent inorganic pigment and of such a pigment with not more than an equal weight of a powdered extender material into a synthetic liquid polymerized from at least one monomer selected from the group consisting of 2-methylpropene, 1-butene, 2-butene, 2-methyl-1-butene, 2-methyl-2-butene, and 2-pentene to form a liquid hydrocarbon vehicle having a viscosity at room temperature within the range of 2.5 to 1000 poises and an average molecular weight within the approximate range of 400 to 1,300; and milling said mixture to reduce large agglomerates of said pigment and to disperse said pigment and any such extender material throughout said vehicle in particles effectively all of which are of printable particle sizes.

18. The method of making a luminescent printing composition, comprising: mixing a particulate photoluminescent pigment selected from the group consisting of sulfides of zinc, of cadmium, and combinations thereof into a synthetic liquid which has been polymerized from normal and branched chain butenes to form a liquid polybutene vehicle having a viscosity at room temperature within the range of 2.5 to 1,000 poises and an average molecular weight within the approximate range of 450 to 1,100; and milling the resulting mixture until said pigment is dispersed in said vehicle in printable particle sizes substantially less than five microns.

References Cited in the file of this patent

UNITED STATES PATENTS

| | | |
|---|---|---|
| 2,154,089 | Hillman | Apr. 11, 1939 |
| 2,395,185 | Isenberg et al. | Feb. 19, 1946 |
| 2,864,771 | Switzer et al. | Dec. 16, 1958 |